United States Patent [19]

Nakamura

[11] Patent Number: 5,677,485
[45] Date of Patent: Oct. 14, 1997

[54] ACCELERATION SENSOR WITH COMPENSATION FOR AMBIENT TEMPERATURE CHANGE

[75] Inventor: Takeshi Nakamura, Uji, Japan

[73] Assignee: Murata Manufacturing Co., Ltd., Japan

[21] Appl. No.: 538,363

[22] Filed: Oct. 3, 1995

[30] Foreign Application Priority Data

Oct. 4, 1994 [JP] Japan .................... 6-266366

[51] Int. Cl.$^6$ .................................. G01P 15/08
[52] U.S. Cl. .................... 73/497; 73/514.29; 310/315
[58] Field of Search ........................ 73/497, 514.29, 73/DIG. 1; 310/316, 315, 321, 329

[56] References Cited

FOREIGN PATENT DOCUMENTS

| 0614087 | 9/1994 | European Pat. Off. |
|---|---|---|
| 8714886 | 12/1987 | Germany. |
| 6273438 | 9/1994 | Japan. |

Primary Examiner—John E. Chapman
Attorney, Agent, or Firm—Ostrolenk, Faber, Gerb & Soffen, LLP

[57] ABSTRACT

An acceleration sensor includes a vibrator and a plurality of pairs of piezoelectric elements which are arranged so as to confront each other through the vibrator. The vibrator is structured so as to be uniformly deformed in accordance with temperature variations. Two pairs of the confronting piezoelectric elements are polarized in opposite directions. An oscillation circuit is connected between the piezoelectric elements and the vibrator to supply the piezoelectric elements with the same driving signals. A first differential circuit is connected to one pair of piezoelectric ceramic elements and a second differential circuit is connected to the other pair of piezoelectric ceramic elements. A third differential circuit is connected to receive the outputs of the first and second differential circuits and provides the output of the acceleration sensor. The differential circuits offset signals due to temperature variations while outputting signals due to acceleration, thereby preventing variations of atmospheric temperature from causing erroneous indications of acceleration.

15 Claims, 5 Drawing Sheets

ACCELERATION SENSOR WITH COMPENSATION FOR AMBIENT TEMPERATURE CHANGE

BACKGROUND OF THE INVENTION

1. Field of the Invention

The present invention relates to an acceleration sensor, and particularly to an acceleration sensor using longitudinal vibration of a vibrator to sense acceleration.

2. Description of Related Art

A known acceleration sensor is disclosed in Japanese Laid-open Patent Application No. Hei-6-273438.

In this known acceleration sensor, it is possible for a vibrator to be deformed due to expansion and contraction thereof when atmospheric temperature varies. The deformation of the vibrator causes a variation of the output signal of a piezoelectric element, which causes an erroneous signal to be outputted from a differential circuit. In such a case, the sensor erroneously detects the application of acceleration even though no acceleration is actually applied. An output signal which is caused by a variation of the atmospheric temperature is not distinguishable from an output signal based on an actual acceleration.

SUMMARY OF THE INVENTION

Therefore, an object of the present invention is to provide an acceleration sensor which is capable of producing an output signal with compensation for variations in atmospheric temperature and obtaining an output signal due to only acceleration.

In order to attain the above object, according to a broad aspect of the present invention, an acceleration sensor includes a plate-shaped vibrator, a plurality of piezoelectric elements which are arranged so as to confront each other through the vibrator at a corresponding plurality of positions, an oscillation circuit for supplying the piezoelectric elements with a driving signal so as to cause the vibrator to have longitudinal vibrations with opposite expansion and contraction movements at the two ends of the vibrator, on respective sides of the center portion in its longitudinal direction, a first differential circuit for differentiating the output signals of a first pair of the piezoelectric elements, a second differential circuit for differentiating the output signals of a second pair of the piezoelectric elements, and a third differential circuit for differentiating the output signals of the first and second differential circuits. According to this aspect of the invention, there is also provided means for nulling a difference between the output signals of the first and second differential circuits which is caused by variation of atmospheric temperature. Such a means for nulling the difference between the output signals of the first and second differential circuits which is caused by a variation of atmospheric temperature prevents the third differential circuit from providing an erroneous detection of acceleration due to temperature variation.

According to another aspect of the present invention, the nulling means is means for nulling a component of the output signal of the third differential circuit which is caused by a variation of atmospheric temperature. Such a means for nulling a component of the output signal of the third differential circuit which is caused by a variation of atmospheric temperature also prevents an erroneous detection of acceleration due to the temperature variation.

According to a further aspect of the present invention, the vibrator is structured for being uniformly deformed in accordance with a variation of atmospheric temperature. If the vibrator deforms uniformly in accordance with the variation of the atmospheric temperature, the difference between the output signals of one pair of piezoelectric elements is equal to the difference between the output signals of the other pair of piezoelectric elements. Accordingly, the difference between the output signals of the first and second differential circuits is equal to zero, and thus no signal due to the temperature variation is outputted from the third differential circuit.

According to yet another aspect of the present invention, a member is associated with the vibrator and serves to adjust deformation of the vibrator such that the output signals of the first and second differential circuits which are caused by the deformation of the vibrator due to variation of atmospheric temperature are equal to each other. If there is provided such a member, no signal due to the temperature variation is outputted from the third differential circuit.

In order to deform the vibrator uniformly in accordance with the variation of atmospheric temperature, the vibrator may be formed by adhering two members of different thermal expansion coefficients together. With this structure, the vibrator can deform with a uniform curvature in accordance with a variation of atmospheric temperature by the same action as bimetal.

Also, a dead-weight may be provided at one end of the vibrator. Acceleration is applied to the dead-weight and thus the vibrator is greatly deformed on the side opposite to the dead-weight so that different signals are outputted from the first and second differential circuits. Accordingly, a signal corresponding to the acceleration is outputted from the third differential circuit.

Furthermore, in order to induce a vibration wherein expansion and contraction movements of the vibrator are opposite at the two ends of the vibrator, two pairs of facing piezoelectric elements may be provided, with one pair of piezoelectric elements being polarized in a direction from the outside to the inside while the other pair of piezoelectric elements are polarized in a direction from the inside to the outside.

In this arrangement, the two pairs of piezoelectric elements are vibrated in opposite directions by applying the same level and phase driving signals to the respective pairs of piezoelectric elements. With this vibrating motion, the vibrator has a longitudinal vibration with the expansion and contraction reversed at the two ends of the vibrator, i.e., on the two sides of the center portion of the vibrator along its length.

The piezoelectric elements also may have the same direction of polarization if appropriate arrangements are made for driving them.

According to the present invention, signals which are generated due to variation of atmospheric temperature can be offset, thereby preventing erroneous detection of acceleration due to the variation of the atmospheric temperature. Furthermore, when the vibrator is vibrated with the expansion and contraction reversed at the two ends of the vibrator, the total length of the vibrator is not varied, and thus the vibrator can be stably supported. Therefore, leakage of vibration can be prevented and an acceleration sensor having high sensitivity can be obtained.

The above object and other objects, features and advantages of the present invention will be further apparent from the following detailed description of preferred embodiments of the present invention with reference to the accompanying drawings.

DETAILED DESCRIPTION OF EMBODIMENTS OF THE INVENTION

Preferred embodiments according to the present invention will be hereunder described with reference to the accompanying drawings.

Figure 1:
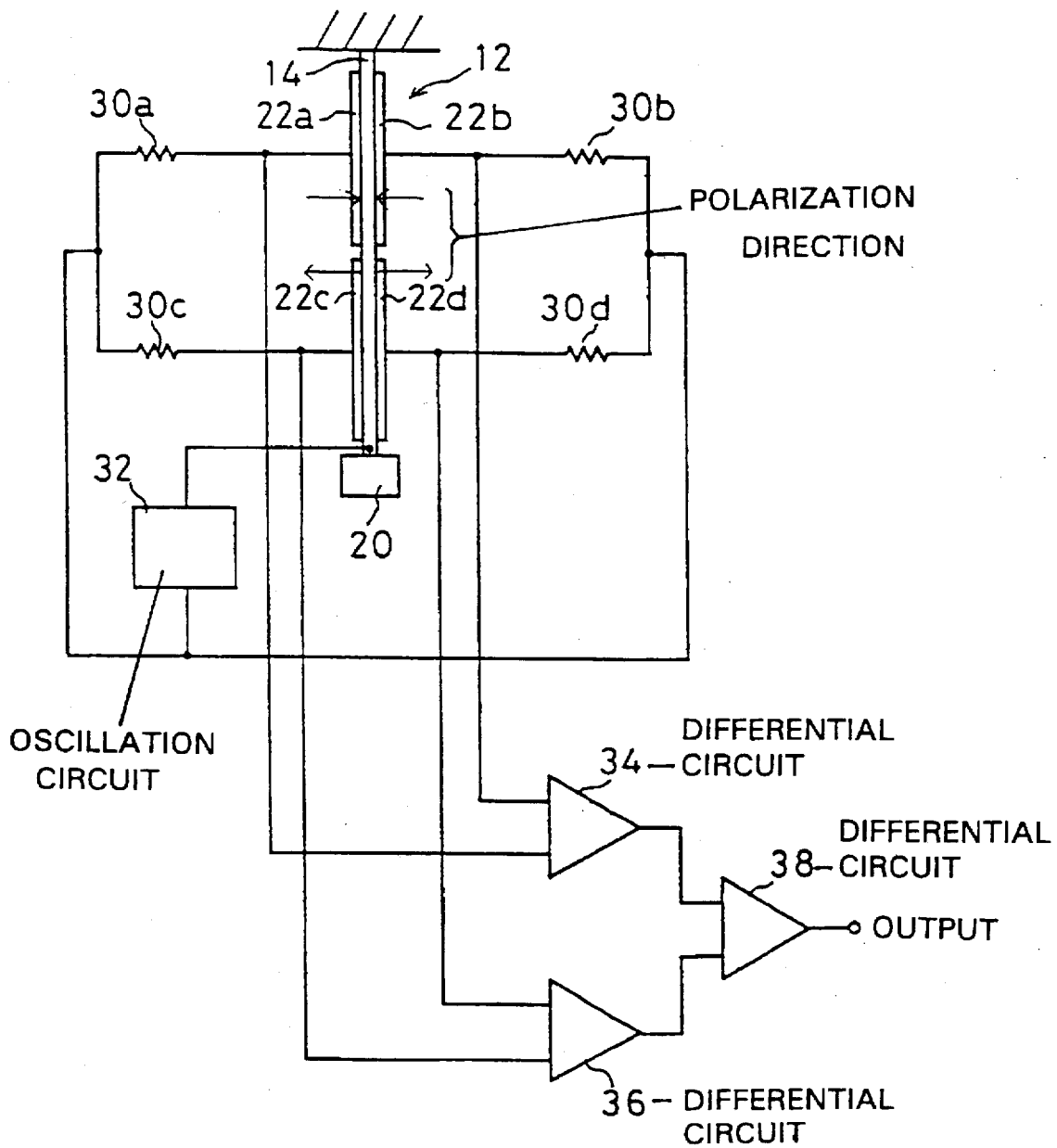
FIG. 1 is a diagram showing an acceleration sensor according to an embodiment of the present invention.
Figure 2:
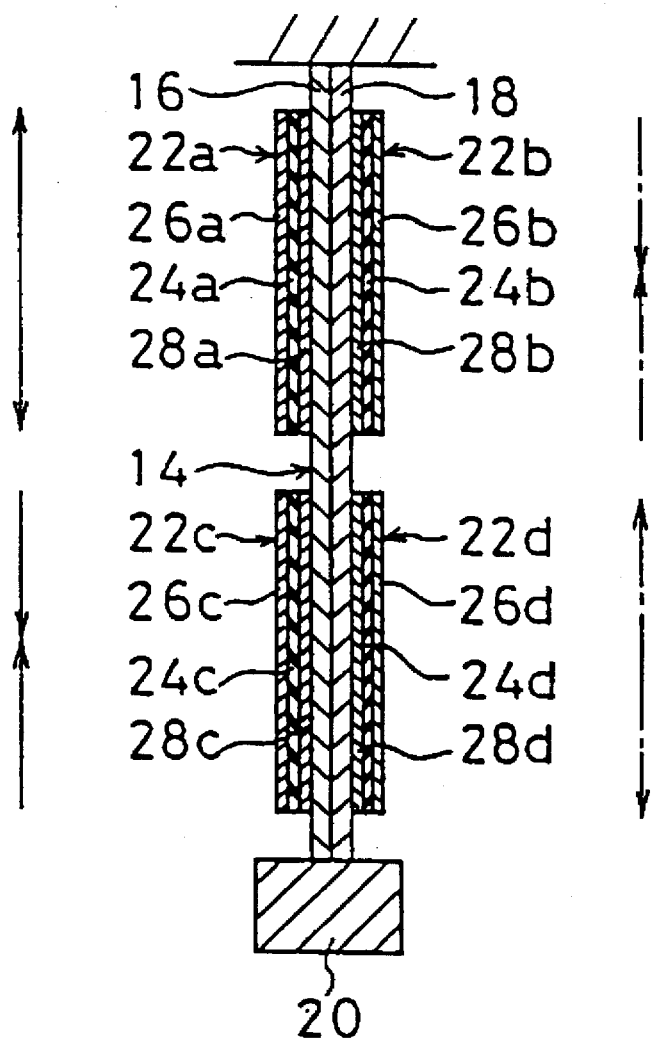
FIG. 2 is a cross-sectional view showing a vibrator used in the acceleration sensor of FIG. 1.

FIG. 1 is a schematic diagram showing an acceleration sensor according to an embodiment of the present invention. An acceleration sensor 10 of this embodiment has an oscillator 12 including a plate-shaped vibrator 14. As shown in FIG. 2, the plate-shaped vibrator is formed by adhering two plate members 16 and 18 having different thermal expansion coefficients together, for example. A dead-weight 20 is provided at one end of the vibrator 14, and it is supported by a frame at the other end thereof.

As shown in FIG. 2, piezoelectric elements 22a, 22b, 22c and 22d are formed at both ends of the vibrator, above and below the center portion (as seen in the drawing) in the longitudinal direction of the vibrator 14. The piezoelectric elements 22a and 22b are disposed so as to confront each other through the vibrator 14. The other piezoelectric elements 22c and 22d are also disposed so as to confront each other through the vibrator 14. The piezoelectric element 22a includes a piezoelectric plate 24a which is formed of piezoelectric ceramic material, for example. Electrodes 26a and 28a are formed on both surfaces of the piezoelectric plate 24a, and the electrode 28a is adhesively attached to the vibrator 14. Likewise, each of the other piezoelectric elements 22b, 22c, 22d includes a respective piezoelectric plate 24b, 24c, 24d. Electrodes 26b and 28b, electrodes 26c and 28c, and electrodes 26d and 28d are formed respectively on both surfaces of each piezoelectric plate 24b, 24c, 24d. Furthermore, the electrodes 28b, 28c and 28d are adhesively attached to the vibrator 14.

As indicated by the arrows in FIG. 1, in the pair of confronting piezoelectric elements 22a and 22b, the piezoelectric plates 24a and 24b are polarized in a direction from the outside to the inside. Furthermore, in the pair of confronting piezoelectric elements 22c and 22d, the piezoelectric plates 24c and 24d are polarized in a direction from the inside to the outside.

The piezoelectric elements 22a, 22b, 22c and 22d are connected to resistors 30a, 30b, 30c and 30d respectively, and an oscillation circuit 32 is connected between the resistors 30a to 30d and the vibrator 14. The oscillation circuit 32 comprises an amplifier and a phase correction circuit. The output signal of the oscillation circuit 32 is supplied to the electrodes 26a to 26d of the piezoelectric elements 22a to 22d, and the signals from the electrodes 28a to 28d are fed back to the oscillation circuit 32 through the vibrator 14, so that the oscillator 12 is vibrated in its longitudinal direction by self-excited vibration.

In this embodiment, as indicated by the arrows in FIG. 1, the piezoelectric plates 24a and 24b of the piezoelectric elements 22a and 22b are polarized in the direction from the outside to the inside while the piezoelectric plates 24c and 24d of the piezoelectric elements 22c and 22d are polarized in the direction from the inside to the outside. Accordingly, when the same signal is inputted to these piezoelectric elements 22a to 22d, the piezoelectric elements 22a and 22b are vibrated in one direction and the piezoelectric elements 22c and 22d are vibrated in the opposite direction. Therefore, the vibrator 14 is vibrated with an expansion and contraction motion which is reversed at the two ends of the vibrator, i.e., at the end near the frame and the opposite end near the dead-weight 20. In addition, since the piezoelectric elements 22a and 22b face each other while the piezoelectric elements 22c and 22d also face each other, as one end of the vibrator 14 is expanded, the other end of the vibrator 14 is contracted as indicated by the solid lines on the left side of FIG. 2. Conversely, as the first end of the vibrator 14 is contracted, the second end is expanded, as indicated by the dotted lines on the right side of FIG. 2. With this vibrational motion, the vibrator 14 can be vibrated in its longitudinal direction while the total length of the vibrator 14 does not vary. Such a vibration supplies the vibrator 14 with inertia.

Figure 4:
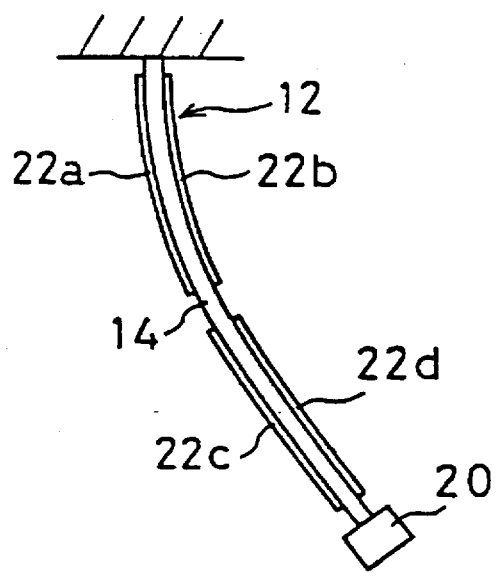
FIG. 4 is a diagram showing a deformation state of the vibrator when acceleration is applied.

When the vibrator 14 is bent due to acceleration, as seen for example in FIG. 4, not only do the resonance frequencies of the two ends of the convex side of the vibrator 14 become different, but also the resonance frequencies of the two ends of the concave sides become different, and thus an output signal which is different in phase from the input signal is obtained. The confronting piezoelectric elements 22a and 22b are connected to input terminals of the first differential circuit 34, and the other confronting piezoelectric elements 22c and 22d are connected to input terminals of the second differential circuit 36. The output terminals of the two differential circuits 34 and 36 are connected to input terminals of the third differential circuit 38. In this acceleration sensor 10, the phase difference of the signals which are produced by the piezoelectric elements 22a and 22b in response to the vibration of the vibrator 14 is detected by the first differential circuit 34. The phase difference of the signals which are produced by the piezoelectric elements 22c and 22d in response to the vibration of the vibrator 14 is detected by the second differential circuit 36. Furthermore, the phase difference between the output signals of the first and second differential circuits 34 and 36 is detected by the third differential circuit 38.

When no acceleration is applied to the acceleration sensor 10, the same signal is outputted from the piezoelectric elements 22a and 22b, and thus no signal is outputted from the first differential circuit 34. Furthermore, in this case the same signal is outputted from the piezoelectric elements 22c and 22d, and thus no signal is outputted from the second differential circuit 36. Therefore, no signal is outputted from the third differential circuit 38, and thus it is detected that no acceleration is being applied to the acceleration sensor.

When an acceleration is applied to the acceleration sensor 10, an inertial force acts on the vibrator 14 and the dead-weight 20, and the vibrator 14 is bent, so that there occurs a phase difference between the signals outputted from the piezoelectric elements on the convex side of the bent vibrator 14 and the signals outputted from the piezoelectric elements on the concave side of the bent vibrator 14. Accordingly, signals are outputted from the first and second differential circuits 34 and 36, and thus a signal is also outputted from the third differential circuit 38. The output signal from the third differential circuit 38 corresponds to the acceleration, and thus the acceleration can be detected by measuring the output signal of the third differential circuit 38.

In this case, since the same driving signal is supplied to the piezoelectric elements 22a to 22d, a driving signal component is offset between the first and second differential circuits 34 and 36. Accordingly, the driving signal component is not outputted from the third differential circuit 38 irrespective of presence or absence of the acceleration.

Figure 3:
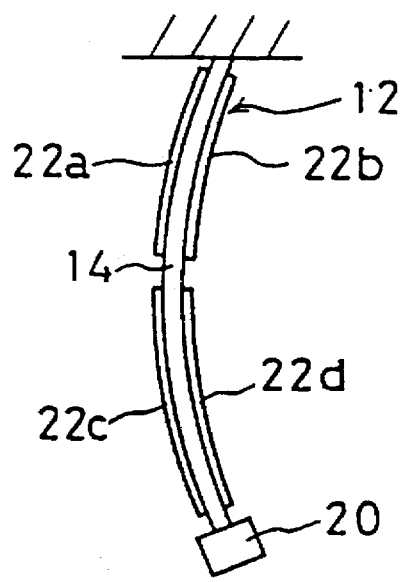
FIG. 3 is a diagram showing a deformation state of the vibrator when atmospheric temperature varies.

When no acceleration is applied to the acceleration sensor 10, the vibrator 14 is not bent. However, since the vibrator 14 is formed by adhering the two plate members 16 and 18 having different thermal expansion coefficients together, the vibrator is bent at a constant curvature when there occurs a variation of atmospheric temperature, like a bimetal, as shown in FIG. 3. Since the vibrator 14 is bent at a constant curvature, the signals occurring in the piezoelectric elements 22a and 22c on the convex side of the bent vibrator 14 have the same phase. Likewise, the signals occurring in the piezoelectric elements 22b and 22d on the concave side of the bent vibrator 14 have the same phase.

Accordingly, the output signal of the first differential circuit 34 is equal to the output signal of the second differential circuit 36, so the output signal of the first differential circuit 34 and the output signal of the second differential circuit 36 are offset in the third differential circuit 38. Accordingly, no signal is outputted from the third differential circuit 38. Thus, a variation in the atmospheric temperature can be prevented from being erroneously detected as an acceleration.

Furthermore, as described above, one end of the vibrator 14 is secured to the dead-weight 20 and the other end of the vibrator 14 is mounted on a frame. Accordingly, when acceleration is applied, the portion of the vibrator 14 near the mount portion is more greatly bent than the portion of the vibrator 14 near the dead-weight 20, as shown in FIG. 4, so that the output signals of the piezoelectric elements 22a and 22c on the convex side of the bent vibrator 14 have different phases, and likewise the piezoelectric elements 22b and 22d on the concave side of the bent vibrator 14 also have different phases. Therefore, the output signals of the first and second differential circuits 34 and 36 have different phases. Thus, the signal corresponding to the acceleration is outputted from the third differential circuit 38.

As described above, in the acceleration sensor 10 thus constructed, the vibrator 14 is uniformly deformed in accordance with variations in atmospheric temperature, so that signals due to the variations in atmospheric temperature offset each other. Accordingly, even when the acceleration sensor 10 is mounted in a place with variable temperature, acceleration can be accurately measured.

In addition, since the vibrator 14 vibrates longitudinally without variation in its total length, the vibrator 14 can be easily supported and with little leakage of vibration. Therefore, acceleration can be detected with high sensitivity.

Figure 5:
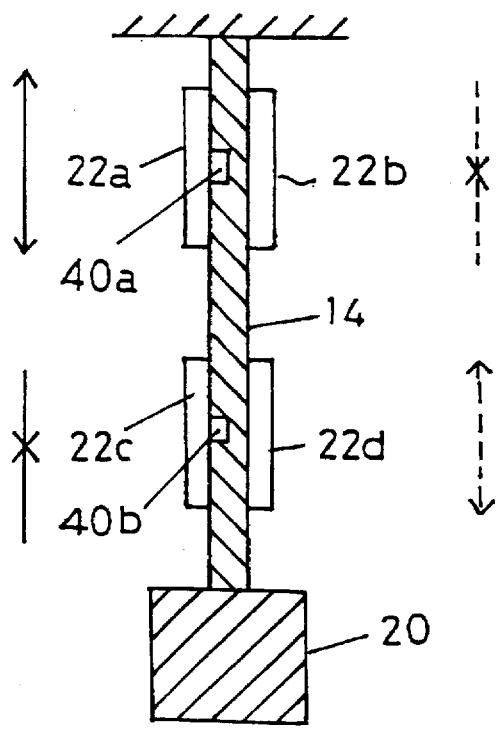
FIG. 5 is a cross-sectional view showing a vibrator used in a second embodiment of the present invention.

In the above-mentioned embodiment, the vibrator 14 is formed by adhering the plate members 16 and 18 having different thermal expansion coefficients together. In a second embodiment of the invention, the vibrator 14 may be formed by a method of forming partial recess portions 40a and 40b in a plate-shaped vibrator so as to partially vary the thickness of the vibrator as shown in FIG. 5.

Figure 6:
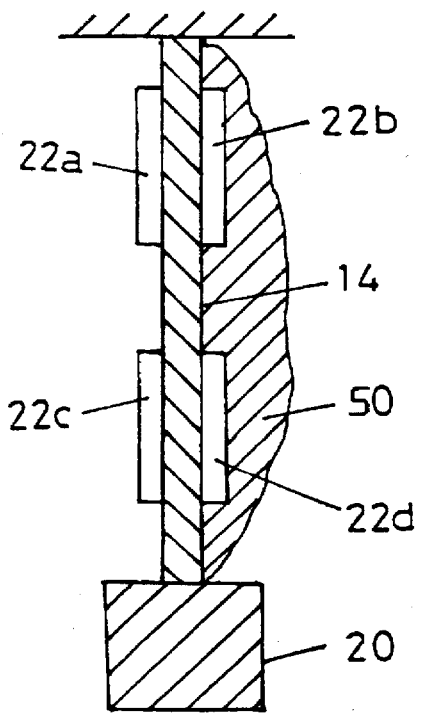
FIG. 6 is a cross-sectional view showing a vibrator used in a third embodiment of the present invention.

According to a third embodiment, a material 50 having a large thermal expansion coefficient (any well-known material may be used in accordance with its suitability for this purpose) is attached to a vibrator which is formed of a plate member as shown in FIG. 6.

Figure 7:
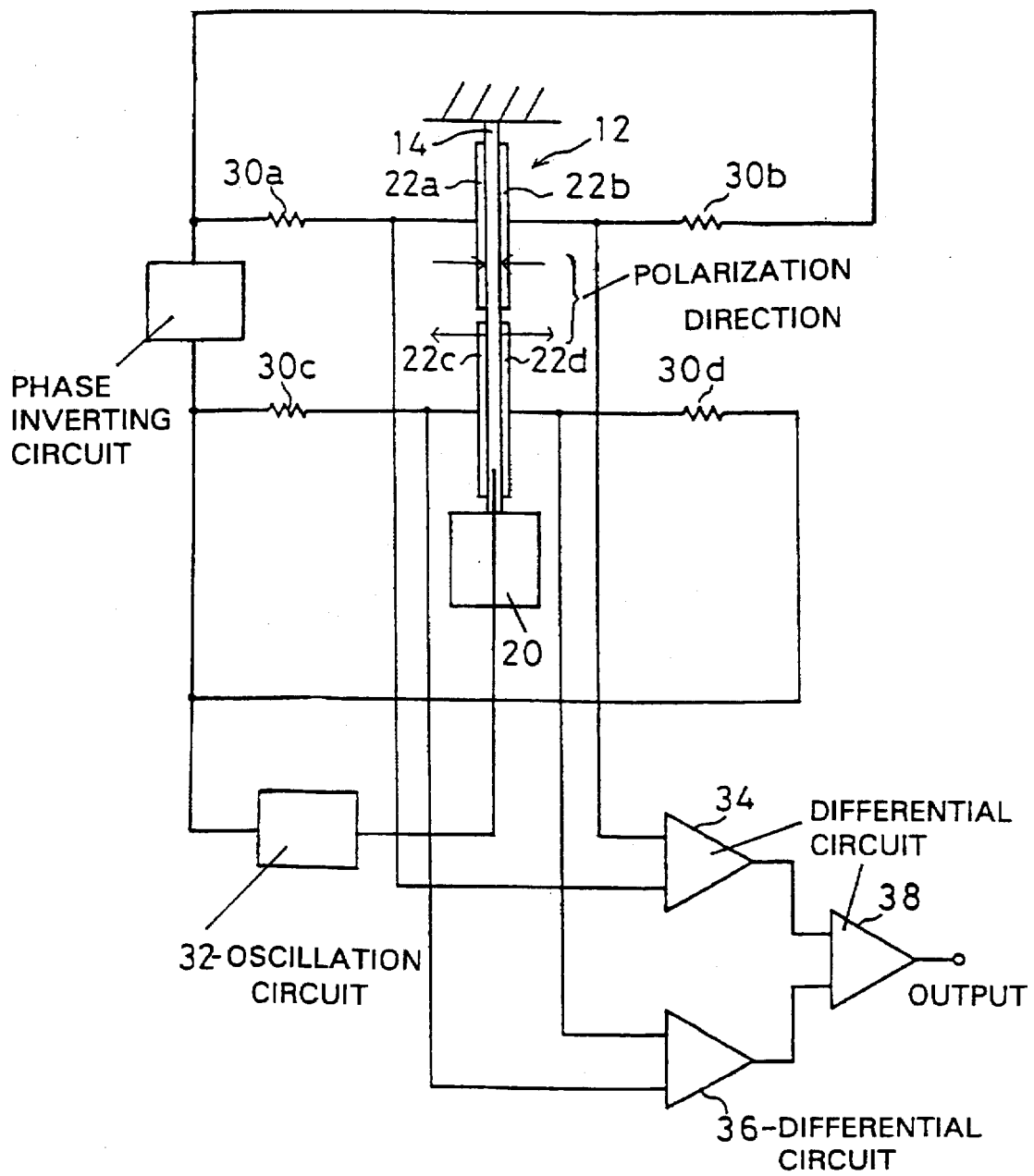
FIG. 7 is a diagram showing a fourth embodiment of the present invention.

Furthermore, in the first embodiment, the piezoelectric elements 22a, 22b and the piezoelectric elements 22c, 22d are polarized in opposite directions. However, all the piezoelectric elements 22a, 22b, 22c, and 22d may be polarized in the same direction, for example, in a direction from the outside to the inside as shown in FIG. 7. In this case, the piezoelectric elements 22a, 22b and the piezoelectric elements 22c, 22d may be supplied respectively with opposite-phase driving signals to induce a vibration where the expansion and contraction movements of the vibrator are reversed at the two ends thereof as in the first embodiment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An acceleration sensor with compensation for ambient temperature changes, comprising:

a plate-shaped vibrator with a distal end and a proximal end;

a plurality of pairs of piezoelectric elements which are arranged on the vibrator so as to confront each other through the vibrator at a corresponding plurality of positions;

an oscillation circuit for supplying said piezoelectric elements with a driving signal so as to cause said vibrator to have a longitudinal vibration with opposite expansion and contraction movements at said distal and proximal ends;

a first differential circuit for differentiating the output signals of a first pair of said piezoelectric elements;

a second differential circuit for differentiating the output signals of a second pair of piezoelectric elements;

a third differential circuit for differentiating the output signals of said first and second differential circuits; and said plate-shaped vibrator having means for preventing a difference between the output signals of said first and second differential circuits caused by an ambient temperature change.

2. An acceleration sensor with compensation for ambient temperature changes, comprising:

a plate-shaped vibrator with a distal end and a proximal end;

a plurality of pairs of piezoelectric elements which are arranged on the vibrator so as to confront each other through said vibrator at a corresponding plurality of positions;

an oscillation circuit for supplying said piezoelectric elements with a driving signal so as to cause said vibrator to have a longitudinal vibration with opposite expansion and contraction movements at said distal and proximal ends;

a first differential circuit for differentiating the output signals of a first pair of said piezoelectric elements;

a second differential circuit for differentiating the output signals of a second pair of piezoelectric elements;

a third differential circuit for differentiating the output signals of said first and second differential circuits; and said plate-shaped vibrator having means for preventing an output signal component of said third differential circuit caused by an ambient temperature change.

3. An acceleration sensor with compensation for ambient temperature changes, comprising:
- a plate-shaped vibrator with a distal end and a proximal end, and structured for deforming uniformly in response to an ambient temperature change;
- a plurality of pairs of piezoelectric elements which are arranged on the vibrator so as to confront each other through said vibrator at a corresponding plurality of positions;
- an oscillation circuit for supplying said piezoelectric elements with a driving signal so as to cause said vibrator to have a longitudinal vibration with opposite expansion and contraction movements at said distal and proximal ends;
- a first differential circuit for differentiating the output signals of a first pair of said piezoelectric elements;
- a second differential circuit for differentiating the output signals of a second pair of piezoelectric elements;
- a third differential circuit for differentiating the output signals of said first and second differential circuits.

4. An acceleration sensor with compensation for ambient temperature changes, comprising:
- a plate-shaped vibrator with a distal end and a proximal end;
- a plurality of pairs of piezoelectric elements which are arranged on the vibrator so as to confront each other through the vibrator at a corresponding plurality of positions;
- an oscillation circuit for supplying said piezoelectric elements with a driving signal so as to cause said vibrator to have a longitudinal vibration with opposite expansion and contraction movements at said distal and proximal ends;
- a first differential circuit for differentiating the output signals of a first pair of said piezoelectric elements;
- a second differential circuit for differentiating the output signals of a second pair of piezoelectric elements;
- a third differential circuit for differentiating the output signals of said first and second differential circuits; and
- a member which coacts with said vibrator so as to adjust deformation of said vibrator such that output signal components of said first and second differential circuits which are caused by a deformation of said vibrator due to an ambient temperature change are equal to each other.

5. The acceleration sensor as claimed in any one of claims 1 to 4, wherein said vibrator is formed by two members of different thermal expansion coefficients adhered together.

6. The acceleration sensor as claimed in any one of claims 1 to 4, further comprising a dead-weight at said distal end of said vibrator.

7. The acceleration sensor as claimed in any one of claims 1 to 4, wherein one of said first and second pairs of said piezoelectric elements are polarized in a direction toward the vibrator while the other pair of said first and second pairs of piezoelectric elements are polarized in a direction away from the vibrator.

8. The acceleration sensor as claimed in any one of claims 1 to 4, wherein both of said first and second pairs of said piezoelectric elements are polarized in a common direction.

9. The acceleration sensor as claimed in claim 3, wherein said vibrator includes a plurality of recesses on one side thereof for structuring said vibrator to deform uniformly in response to an ambient temperature change.

10. The acceleration sensor as claimed in claim 4, wherein said member comprises a material which is attached to said vibrator and has a selected thermal expansion coefficient so as to cause said vibrator to deform uniformly in response to an ambient temperature change.

11. The acceleration sensor as claimed in claim 5, further comprising a dead-weight at said distal end of said vibrator.

12. The acceleration sensor as claimed in claim 5, wherein one of said first and second pairs of said piezoelectric elements are polarized in a direction toward the vibrator while the other pair of said first and second pairs of piezoelectric elements are polarized in a direction away from the vibrator.

13. The acceleration sensor as claimed in claim 6, wherein one of said first and second pairs of said piezoelectric elements are polarized in a direction toward the vibrator while the other pair of said first and second pairs of piezoelectric elements are polarized in a direction away from the vibrator.

14. The acceleration sensor as claimed in claim 5, wherein both of said first and second pairs of said piezoelectric elements are polarized in a common direction.

15. The acceleration sensor as claimed in claim 6, wherein both of said first and second pairs of said piezoelectric elements are polarized in a common direction.

* * * * *